United States Patent
Smolentzov et al.

(10) Patent No.: US 6,788,656 B1
(45) Date of Patent: Sep. 7, 2004

(54) COMMUNICATION SYSTEM

(75) Inventors: André Smolentzov, Solna (SE); Olof Axel Granberg, Sollentuna (SE); Staffan Alexius, Hjärup (SE); Lars Dovner, Sundsvall (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/565,551

(22) Filed: May 5, 2000

(30) Foreign Application Priority Data

May 7, 1999 (SE) .............................................. 9901673

(51) Int. Cl.⁷ .............................................. H04Q 7/00
(52) U.S. Cl. ..................................................... 370/328
(58) Field of Search ................................. 370/328, 329, 370/330, 331, 332, 333, 345, 349, 350; 455/435.1, 436, 437, 438, 442, 502, 504, 67.11, 67.13

(56) References Cited

U.S. PATENT DOCUMENTS 5,418,843 A * 5/1995 Stjernholm ............ 379/112.01
5,625,627 A * 4/1997 Ishi ............................. 370/347
5,768,267 A * 6/1998 Raith et al. .................. 370/329
6,430,413 B1 * 8/2002 Wedi et al. .................. 455/442
6,590,881 B1 * 7/2003 Wallace et al. ............. 370/332

FOREIGN PATENT DOCUMENTS

WO  95/30285  11/1995
WO  96/41426  12/1996

* cited by examiner

Primary Examiner—Kwang Bin Yao

(57) ABSTRACT

The present invention relates to methods and means for creating a cellular radio communication system (100) out of a number of local radio networks (109, 110), e.g. piconets. The local radio networks (109,110) are unsynchronised with each other and uses a radio interface that has no broadcast channel, e.g. the Bluetooth radio interface. A control unit (108) is connected to each local radio network to provide the basic means and methods for a cellular radio communication system (100). Radio units (101–103) can attach and retain a connection to the control unit (108) via their respective radio node (104–107). The radio units (101–103) can also perform roaming, handover, measurments and fast connection set-ups in the system (100).

9 Claims, 12 Drawing Sheets

| Current BPP | Candidates | Signal strength |
|---|---|---|
| BPP 101 | BRFP 104 | 5 |
|  | BRFP 105 | 2 |
|  | BRFP 106 | 1 |

Fig.4

| Current BRFP | Neighbouring BRFP |
|---|---|
| BRFP 105 | BRFP 104 |
|  | BRFP 106 |

Fig.5

COMMUNICATION SYSTEM

This application claims priority under 35 U.S.C. §§119 and/or 365 to 9901673-5 filed in Sweden on May 7, 1999; the entire content of which is hereby incorporated by reference.

TECHNICAL FIELD OF THE INVENTION

The present invention relates in general to the field of radio communication and, in particular, to methods and means for providing a cellular radio communication system comprising a number of local radio networks utilising radio interfaces that are unsynchronised with each other and have no broadcast control channel.

DESCRIPTION OF RELATED ART

There are a number of equipments that have some sort of radio communication means. By "radio unit" is meant all portable and non-portable equipment intended for radio communication with a radio communication system. Examples of such radio units are mobile phones, cordless phones, pagers, telex, electronic notebooks, PCs and laptops with integrated radios, communicators, computers, wireless head sets, wireless printers, wireless keyboards or any other electronic equipment using a radio link as a mean of communication. These equipments can be used with any type of radio communication system, such as cellular networks, satellite or small local radio networks. They can also communicate directly with each other without using any system.

Cellular radio communication systems are commonly employed to provide voice and data communications to a plurality of radio units or subscribers.

Examples of such cellular radio communication systems are e.g. AMPS, D-AMPS, GSM, and IS-95 (CDMA). These systems generally include a number of base stations serving portable radio units, one or more base station controllers (BSC) and at least one mobile switching centre (MSC) or similar. All radio transmissions in the system are made via a specific radio interface that enables radio communication between the portable radio units and the base stations.

The cellular radio communication system covers a certain geographical area. This area is typically divided into cells or regions. A cell typically includes a base station and the radio units with which the base station is in communication. The cell associated with the particular base station with which a radio unit is communicating is commonly called the serving cell.

To each cell one or more voice/data and/or traffic/control channels are allocated. Note that "channel" may refer to a specific carrier frequency in an analogue system, e.g. AMPS, a specific carrier/slot combination in a hybrid TDMA/FDMA system, e.g. GSM or one or more assigned codes in a DS-CDMA system.

The cellular radio communication system usually provides a broadcast channel on which all radio units can listen to system information from base stations or measure signal strength and/or signal quality at regular intervals. Such a channel is called Broadcast Control Channel in GSM and Page or Access Channel in D-AMPS.

The process of changing cells during a call is often called a handover or handoff. As soon as one of the neighbouring cells is considered to have a better signal strength/quality than the serving cell, e.g. by signal measurements on the broadcast channel, a handover is made to that particular neighbouring cell.

The ability to move around, changing cells and connections over the radio interface when the radio unit is switched on or is in some kind of stand by mode but not engaged in a call is called roaming. When the radio unit is roaming it listens to the broadcast channel for information about the system e.g. in which specific area of the system the radio is presently located.

Today, a number of low-power, low-cost radio interfaces between radio units and their accessories are being developed. The intention is to replace the cables or infrared links, e.g. between a computer and a printer, with a short-range radio link (a wireless link) forming a local radio network.

A suitable frequency band for such a radio-interface is the 2,4 GHz ISM band (the Industrial-Scientific-Medical band) which ranges from 2,400–2,483 GHz in the US and Europe and from 2,471–2497 GHz in Japan. This frequency band is globally available, licence-free and open to any radio system.

There are some rules each radio system has to follow if they are to use this ISM band, e.g. in the ETSI standard ETS 300328. Synchronisation between different transmitters in a radio system using the ISM band is not allowed. Synchronisation is of course allowed between a transmitter and a receiver, e.g. when two radio units are communicating with each other. Another rule specifies that frequency spreading must be used for a radio interface using the ISM band. The IEEE 802.11 is an example of a specification utilising the ISM band.

An example of such a radio interface is called Bluetooth (see the Telecommunications Technology Journal "Ericsson Review", No. 3 1998, with the article "BLUETOOTH-The universal radio interface for ad hoc, wireless connectivity" by Jaap Haartsen). Bluetooth is an universal radio interface operating within the ISM band and enables portable electronic devices to connect and communicate wirelessly via short-range, ad hoc networks (local radio networks). Bluetooth uses a frequency-hop spread spectrum technique (FH-CDMA) where the frequency band is divided into several hop channels. During a connection, radio units with Bluetooth transceivers hop from one channel to the other in a pseudo-random fashion. Each channel is divided into a number of slots in a time division multiplexing scheme, where a different hop frequency is used for each slot.

A radio unit with Bluetooth can simultaneously communicate with up to seven other radio units in a small local radio network called a piconet. Each piconet is established by a unique frequency-hopping channel, i.e. all radio units in a specific piconet share the same frequency hopping scheme. One radio unit acts as a master, controlling the traffic in the piconet, and the other radio units in the piconet act as slaves. Any radio unit can become a master, but only one master may exist in a piconet at any time (often the one that initiates the connection). It is often the radio unit that initiates the connection that acts as a master. Any radio unit may change its role from slave to master or vice versa (a slave to master or a master to slave switch) Every radio unit in the piconet uses the master identity and realtime clock to track the hopping channel. Hence the slaves must be informed of the identity and the clock of the master before they can communicate with the master.

Bluetooth supports both point-to-point (master to a slave) and point-to-multipoint (master to a number of slaves) connections. Two slaves can only communicate with each other through a master or by changing one of the slaves to a master with a slave to master switch.

There is no hop or time synchronisation between radio units in different piconets but all radio units participating in the same piconet are hop synchronised to one frequency-hopping channel and time synchronised so that they can transmit or receive at the right time. This does not contravene the rules of non synchronisation between transmitters in the ISM band because there is only one radio unit that is transmitting at any time instant in the piconet.

A radio unit can act as a slave in several piconets. This is achieved by using the time division multiplexing scheme of the channels where e.g. a first piconet is visited in a first time slot and a second piconet is visited in a third time slot. There are three different time slots on each channel where each time slot is split in two portions, one portion for transmitting and one portion for receiving.

There is no broadcast channel (e.g. a Broadcast Control Channel in GSM) in Bluetooth to which radio units that are not connected to or have not been connected to a Bluetooth piconet can listen to system information, "find" a base station or to measure the signal strength/quality on.

As Bluetooth is designed to replace cables or infrared links between different electronic equipments no roaming or handover support have been incorporated in the radio interface. As soon as a radio unit connected to a piconet is moved outside the radio coverage of the master, the radio unit loses its connection (the call).

SUMMARY

A number of problems occur when local radio networks, utilising radio interfaces that are unsynchronised with each other and have no broadcast control channel, are to be connected into and used as a cellular radio communication system.

A radio unit that is switched on in a local radio network can not be attached to the system with the help of a broadcast channel.

A radio unit that has established a link to one local radio network can not reach or be reached from another local radio network.

A radio unit can not roam or perform handover to a new local radio network when it is moved outside the local radio network it was first connected to.

The system can not measure the signal strength/quality from and keep track of neighbouring local radio networks to be able to perform high quality roaming and handover.

A radio node/base station from one local radio network can not establish a link with a radio unit in a neighbouring local radio network.

In light of the foregoing, a primary object of the present invention is to provide methods and means for creating a cellular radio communication system out of a number of local radio networks, where each network utilises a radio interface that has no broadcast channel and is unsynchronised compared to the other radio interfaces in the system. E.g. methods and means for attaching a radio unit to the system, retaining the connection to the system and providing measuring, roaming and handover capabilities.

According to a first aspect of the present invention there is a method for attaching a radio unit to a cellular radio communication system comprising a number of local radio networks utilising radio interfaces that are unsynchronised with each other.

According to a second aspect of the present invention there is a method for retaining a connection to a radio unit in a cellular radio communication system comprising a number of local radio networks utilising radio interfaces that are unsynchronised with each other.

According to a third aspect of the present invention there is a method for collecting data for a neighbouring list in a cellular radio communication system comprising a number of local radio networks utilising radio interfaces that are unsynchronised with each other.

According to a fourth aspect of the present invention there is a method for calculating the realtime clock of a first radio node in a second radio node in a cellular radio communication system comprising a number of local radio networks utilising radio interfaces that are unsynchronised with each other.

According to a fifth aspect of the present invention there is a method for co-ordinating the use of time slots in different local radio networks in a cellular radio communication system comprising a number of local radio networks utilising radio interfaces that are unsynchronised with each other.

A system according to the present invention comprises a control unit connected with a number of local radio networks and providing the basic means of a cellular radio communication system.

A control unit according to the present invention is connected with a number of local radio networks to provide the basic means for a cellular radio communication system.

An advantage with the present invention is that it is possible to attach and retain a radio unit that is switched on in the cellular radio communication system with no broadcast channel.

Another advantage is that it is possible to provide roaming and handover between local radio networks having radio interfaces that are unsynchronised with each other.

Still another advantage is that it is possible for a radio node in one local radio network to make a contact with a radio unit in another neighbouring local radio network.

Yet another advantage is that the signalling in the respective local radio network can be coordinated to facilitate inter local radio network communication.

Still another advantage is that it is possible for the system to keep track of neighbouring local radio networks to each ratio unit.

BRIEF DESCRIPTION OF THE DRAWINGS

FIG. 4 is illustrating an example of a $BRFP_{13}$ candidates list according to the present invention.

FIG. 5 is illustrating an example of a neighbouring list according to the present invention.

DETAILED DESCRIPTION OF EMBODIMENTS

As previously stated, the present invention relates to a cellular radio communication system comprising a number of local radio networks (piconets).

Figure 1:
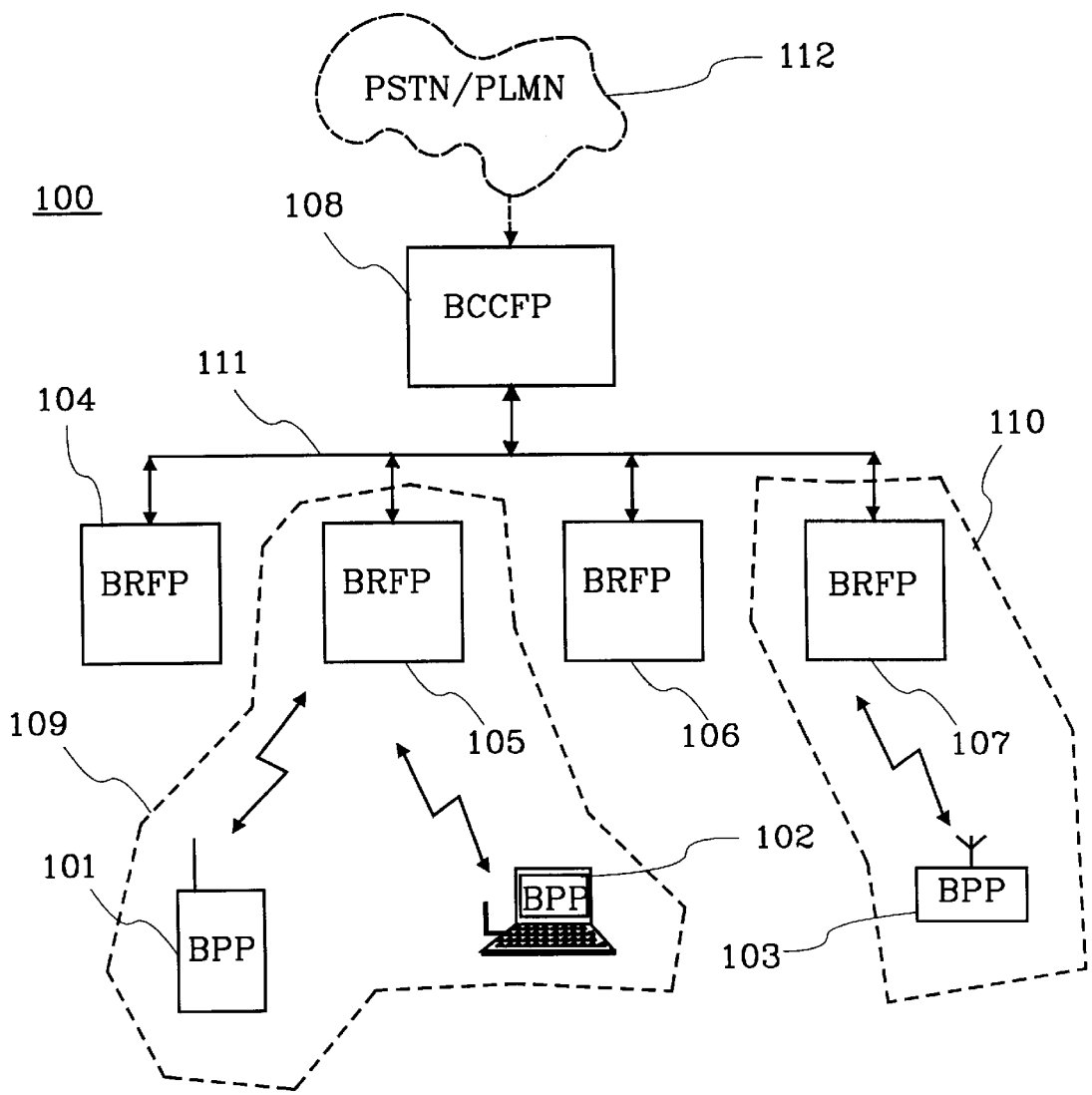
FIG. 1 is illustrating a block diagram of a first embodiment of a cellular radio communication system according to the present invention

FIG. 1 illustrates a block diagram of a first embodiment of a cellular radio communication system 100 for utilising the present invention. The system 100 comprises a control-node (BCCFP) 108 connected to four radio-nodes (BRFP) 104–107 respectively. The BRFP 105 is serving two radio units (BPP) 101, 102 respectively and the BRFP 107 is serving a radio unit (BPP) 103. The BRFP 105 and the two BPPs 101, 102 respectively utilises a radio interface, to enable communication between them, and forms a first piconet 109 (a first local radio network). The BRFP 107 and the BPP 103 utilises the same radio interface and forms a second piconet 110 (a second local radio network). The radio interface used in piconet 109 is not synchronised with the radio interface used in piconet 110.

The control-node 108 may be connected to a PSTN (Public Switched Telephone Network) and/or a PLMN (Public Land Mobile Network) as illustrated by the dashed cloud 112. The control-node 108 can also be connected to other control-nodes so as to form a bigger cellular radio communication system than illustrated in FIG. 1. This system 100 will be described in more detail at the end of this description.

Figure 2:
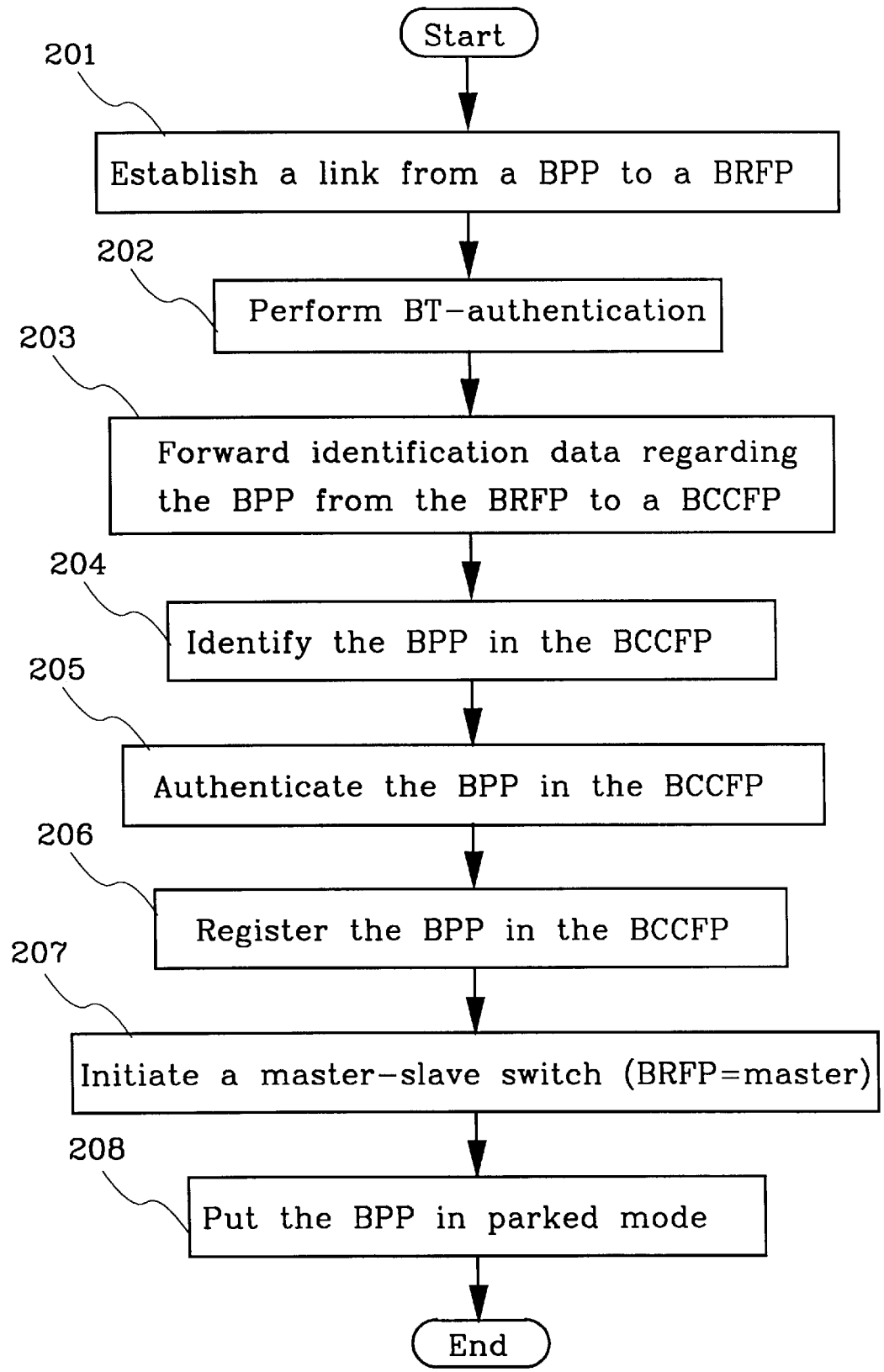
FIG. 2 is illustrating a flow chart of a first method according to the present invention.

FIG. 2 illustrates a flow chart of a first method according to the present invention for attaching the BPP 101 to the cellular radio communication system 100 in FIG. 1. Attaching a BPP means that the cellular system becomes aware of that a new radio unit is switched on in the system, where in the system the new radio unit is located, if the new radio unit is authorised to use the system and to registrate the new radio unit in the system.

According to a step 201, the BPP 101 establishes a link with the BRFP 105 so that it becomes a part of the first piconet 109 in FIG. 1. The BPP scans for BRFPs within its radio coverage area, at regular intervals, by transmitting inquire signals (LC$_{13}$ INQUIRY) including the identity and the realtime clock of the BPP 101. The BRFPs in radio range answers by transmitting acknowledge signals (LC_FHS$_{BRFP}$) including their identity and realtime clocks to the BPP 101. The BPP 101 can then select one of these BRFPs, in this case BRFP 105, and transmit a page signal (LC_PAGE) to the selected BRFP and establish the link. The BPP 101 assumes the role as a master and the BRFP 105 takes the role as a slave. The BRFP 105 receives identification data from BPP 101, e.g. the IEEE-identity and/or if the radio unit 101 is equipped with a SIM-card the IMSI identity. The BRFP 105 also receives information regarding the class of service provided by the BPP 101, authentication, and as previously stated the realtime_clock of the BPP 101 which is needed to calculate the frequency hopping sequence in the BRFP 105.

The BPP 101 makes the first contact, by the LC_INQUIRY, with the BRFP 105 before it can detect any signal from the BRFP 105. The BRFP 105 needs to know at least the identity of the BPP 101 (received by the LC INQUIRY) to be able to transmit a signal that the BPP 101 can detect. This is because that there is no broadcast control channel in the radio interface utilised in the system 100.

According to a step 202, the BRFP 105 performs a Bluetooth authentication (LMP_Bluetooth_Authentication). This is performed between the Bluetooth circuits in the BRFP 105 and the BPP 101 in a known way.

According to step 203, the BRFP 105 forwards the information and the identification data received in step 201 to the BCCFP 108.

According to step 204, the BCCFP 108 identifies the BPP 101 by the identification data.

According to step 205, the BCCFP 108 authenticates the BPP 101. As an example, the known authentication technique used in GSM can be used for this authentication. The IEEE identity with additional authentication information can also be used.

According to step 206, the BCCFP 108 registers the identity of the BPP 101 in the system. This means that the BPP 101 has established a connection with the system 100 and is ready to receive incoming calls etc.

According to a step 207, the BRFP 105 initiates a Master-Slave switch so that the BRFP 105 becomes the master and the BPP 101 becomes the slave.

According to step 208, the BRFP 105 puts the BPP 101 in a parked mode by transmitting a park command. This means that the BPP 101 will terminate the link to the BRFP 105 but still be active and listen for signals from the BRFP 105 (the master) so that it can retain the link to the BRFP 105 again. This means that if the maximum number of BPPs in a piconet is 7 and the BPP 101 was the 7$^{th}$ one a new BPP may be able to connect to the piconet after the BPP 101 is put in the parked mode.

Figure 3:
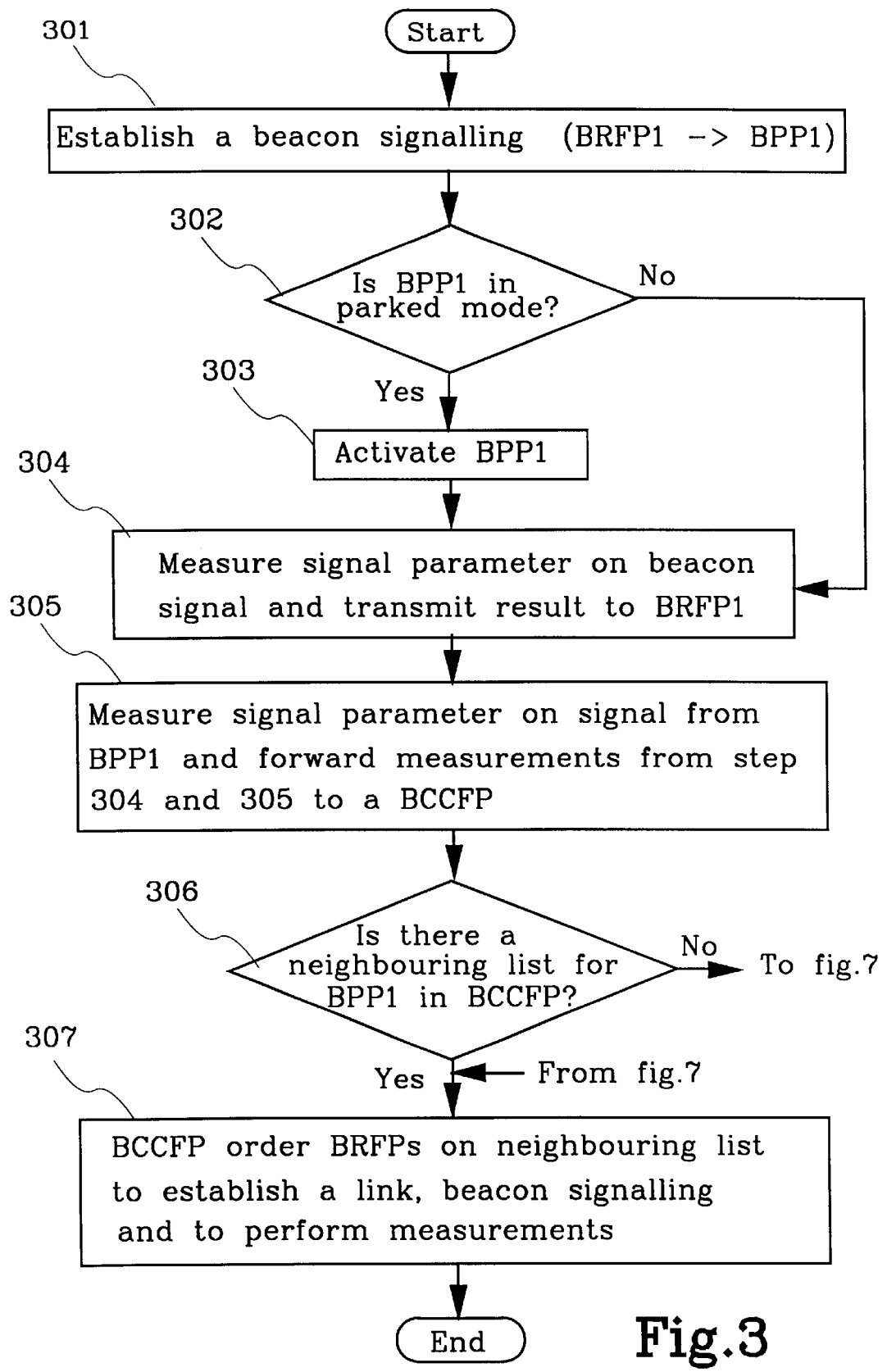
FIG. 3 is illustrating a flow chart of a first embodiment of a second method according to the present invention.

FIG. 3 illustrates a flow chart of a second method according to the present invention for retaining the connection to the BPP 101 in the cellular radio communication system 100 in FIG. 1 after the BPP 101 has been attached to the system.

According to a step 301, the BRFP 105 (the master) establishes a beacon signalling to the BPP 101 (the slave) at evenly spaced time instants (beacon intervals). This means that the BPP 101 receives signals from the BRFP 105 at the beacon intervals.

This beacon signal can as an example comprise parameters that activates a parked slave (e.g. a channel access code for the BPP 101), re-synchronises parked slaves or allows certain slaves to access the channel. This signal can as an alternative also include information regarding how busy the BRFP 105 is. The beacon signal is transmitted to a number of specific radio units, in this case the BPP 101, and not to all radio units within radio range of the radio node as with a broadcast channel. The beacon signal is intended as a means for a master to retain the link to slaves that are not active in any transmissions and if needed to activate parked slaves (see step 208 above).

If, according to a step 302, the BPP 101 is in a parked mode the method continues with step 303, otherwise it continues with step 304.

According to a step 303, the BRFP 105 activates the parked BPP 101 by transmitting a page with the identity of the BPP 101. This can be made at evenly spaced time instants.

According to a step 304, the BPP 101 measures a signal parameter, e.g. the signal quality or signal strength, on the beacon signal from BRFP 105. The BPP 101 transmits this measurement to the BRFP 105 in a result signal.

According to a step 305, the BRFP 105 measures the signal parameter on one or more signals from the BPP 101, e.g. the result signal in step 304. The BRFP 105 forwards the measurements in step 304 and 305 to the BCCFP 108 which stores them in a BRFP_candidates list. See FIG. 4 which illustrates an example of such a list. The BRFP 105 puts the BPP 101 in parked mode again if the BPP 101 where in a parked mode in step 302.

According to step 306, the BCCFP 108 checks if there is a neighbouring list for the BRFP 105 stored in the BCCFP. If not, the method continues with step 701 according to FIG. 7 for creating such a list. The neighbouring list for BRFP 105 comprises information of which additional BRFPs in the system that a BPP connected to BRFP 105 in piconet 109 should be able to hear. FIG. 5 shows an example of such a neighbouring list for BRFP 105 where BRFP 104 and 106 are listed as neighbours.

According to step 307, the BCCFP 108 orders the BRFPs 104 and 106 in the neighbouring list to page the BPP 101, activate the BPP if needed, establish a beacon signalling and perform measurements according to step 301–305. If a BRFP on the neighbouring list is unable to establish a link to the BPP 101 (the BPP 101 may temporarily be out of reach) it will continue to page the BPP 101 as long as the BPP 101 remains in the piconet 109 associated with the BRFP 105. The BRFPs 104 and 106 on the neighbouring list can page (reach) the BPP 101 thanks to the BCCFP 108 which distributes the identity of the BPP 101 to the BRFPs.

The three BRFP 104, 105 and 106 respectively will now have beacon signalling ongoing with the BPP 101. The BRFP 104, 106 respectively will measure one or more signal parameters, e.g. the signal quality and/or signal strength, from the BPP 101 whenever they have free capacity for that. As an alternative, if the BPP 101 is in a parked mode, one BRFP, e.g. BRFP 105, can activate the BPP 101, receive measurements from the BPP and deactivate the BPP within a short interval and the other BRFPs, e.g. BRFP 104 and 106, can do the same but within a longer interval to reduce the signalling within the system. If this is the case, the BPP may perform measurements on the BRFPs 104 and 106 at the same time as on the BRFP 105 and transmit these measurements to the BRFP 105 at the shorter intervals.

Figure 6:
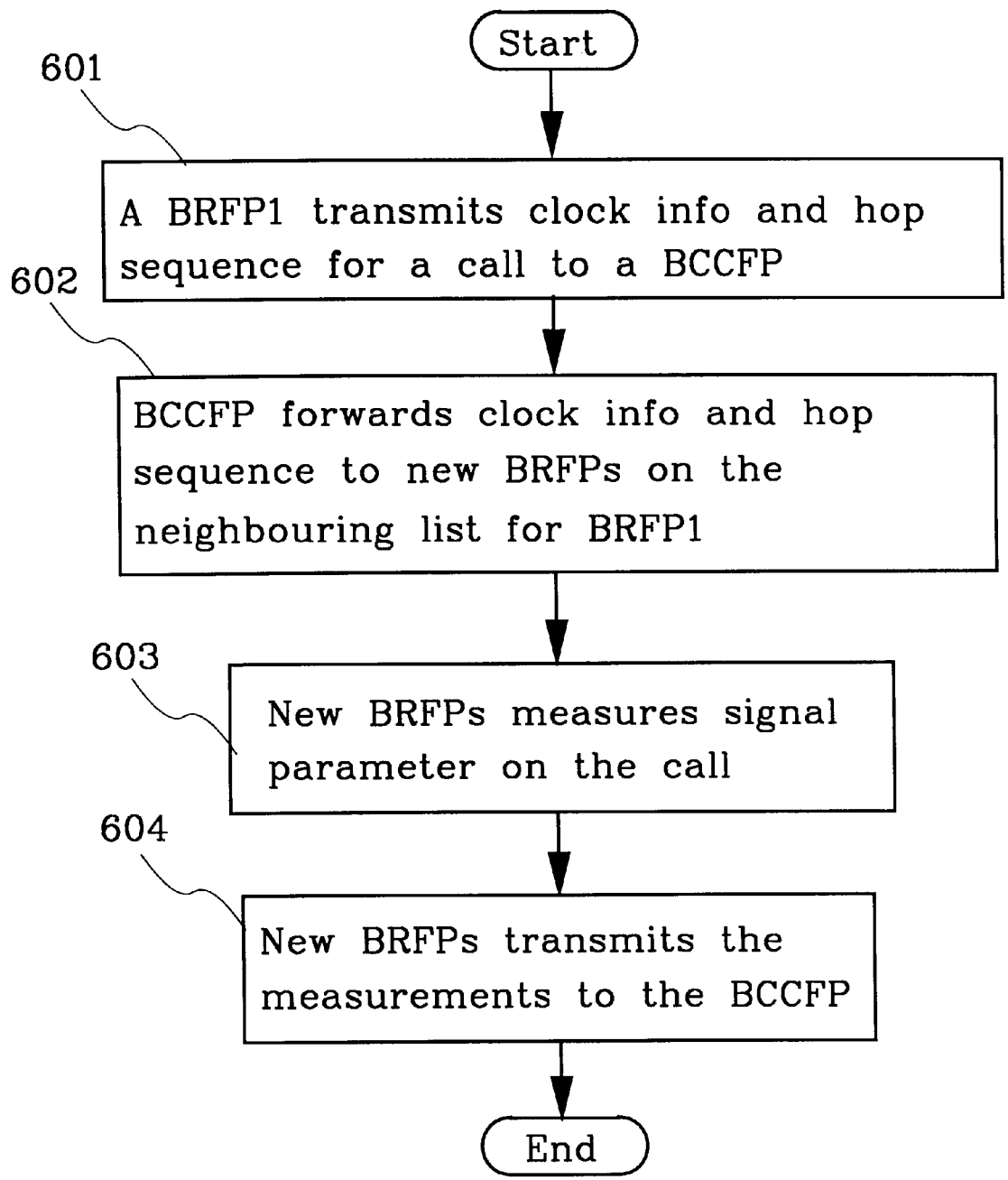
FIG. 6 is illustrating a flow chart of a second embodiment of the second method according to the present invention.

FIG. 6 illustrates a flow chart of a second embodiment of the second method where the measurements in step 304 and 305 are made during an ongoing call. This means that step 304 and 305 according to FIG. 3 may be replaced by the following steps.

According to a step 601, the BRFP 105 transmits information to the BCCFP 108 regarding the exact clock information and hop sequence used for the call/link to the BPP 101.

According to a step 602, the BCCFP 108 forwards the information received in step 601 to the BRFP 104 and 106, i.e. to all additional BRFPs on the neighbouring list for BRFP 105.

According to a step 603, the BRFP 104 and 106 measures the signal strength and/or signal quality on the ongoing call between the BRFP 105 and the BPP 101, e.g. in a separate receiver in the BRFPs dedicated for monitoring (e.g. measuring).

According to a step 604, the BRFP 104 and 106 transmits the measured signal strength and/or signal quality to the BCCFP 108 which stores these measurements in the BRFP_candidates list for the BRFP 105.

The steps 601–604 may in a third embodiment of the second method (not illustrated) be used as a complement to step 304 and 305 instead of replacing them. This means that steps 601–604 are performed after step 607 in FIG. 3.

If the link between the BPP 101 and the BRFP 105 becomes bad the second method may continue to perform roaming as described below (not illustrated in any flow charts).

The link roams from BRFP 105 to BRFP 104 that, according to the BRFP_candidates list for BRFP 105, has the best signal strength and/or signal quality for the moment (see FIG. 4). This means that the BCCFP 108 selects the new BRFP for roaming with the help of the BRFP_candidates list. This selection may as an alternative or as a complement be made on free capacity in the neighbouring BRFPs.

If the BPP 101 does not respond to any signalling from the BRFP 104, e.g. a page signal, the second method may end by unregister the BPP 101 as described below (not illustrated in any flow chart).

The BRFP 104 transmits an unregistered message (UNREG) to the BCCFP 108 regarding a link loss to the BPP 101.

The BCCFP 108 controls if any other BRFP, e.g. BRFP 105 and 106, have an ongoing beacon signalling to the BPP 101. This is made e.g. by checking the BRFPs on the neighbouring list. The BCCFP 108 unregisters the BPP 101 in the system (all links lost to BPP 101) if no BRFP in the system has an ongoing beacon signalling to the BPP 101.

If a system initiated handover is to be performed, the second method may continue with a handover as described below (not illustrated).

The BCCFP 108 selects a new BRFP from the neighbouring list of the BRFP 104 and orders the selected BRFP, e.g. the BRFP 105, to initiate a handover.

If a BPP initiated handover is to be performed, the second method may continue with a handover as described below (not illustrated).

The BPP 101 establishes a new link with the BRFP 105 which, according to the BRFP_candidates list for BPP 101, has the highest signal strength and/or signal quality.

The BRFP 105 orders the BCCFP 108 to route the call to the BRFP 105. Hence both BRFP 104, 105 respectively are connected to the BPP 101 for a short moment.

The BRFP 105 initiates a termination of the link from the BRFP 104 to the BPP 101 when the new link is established. This is made via the BCCFP 108.

Figure 7:
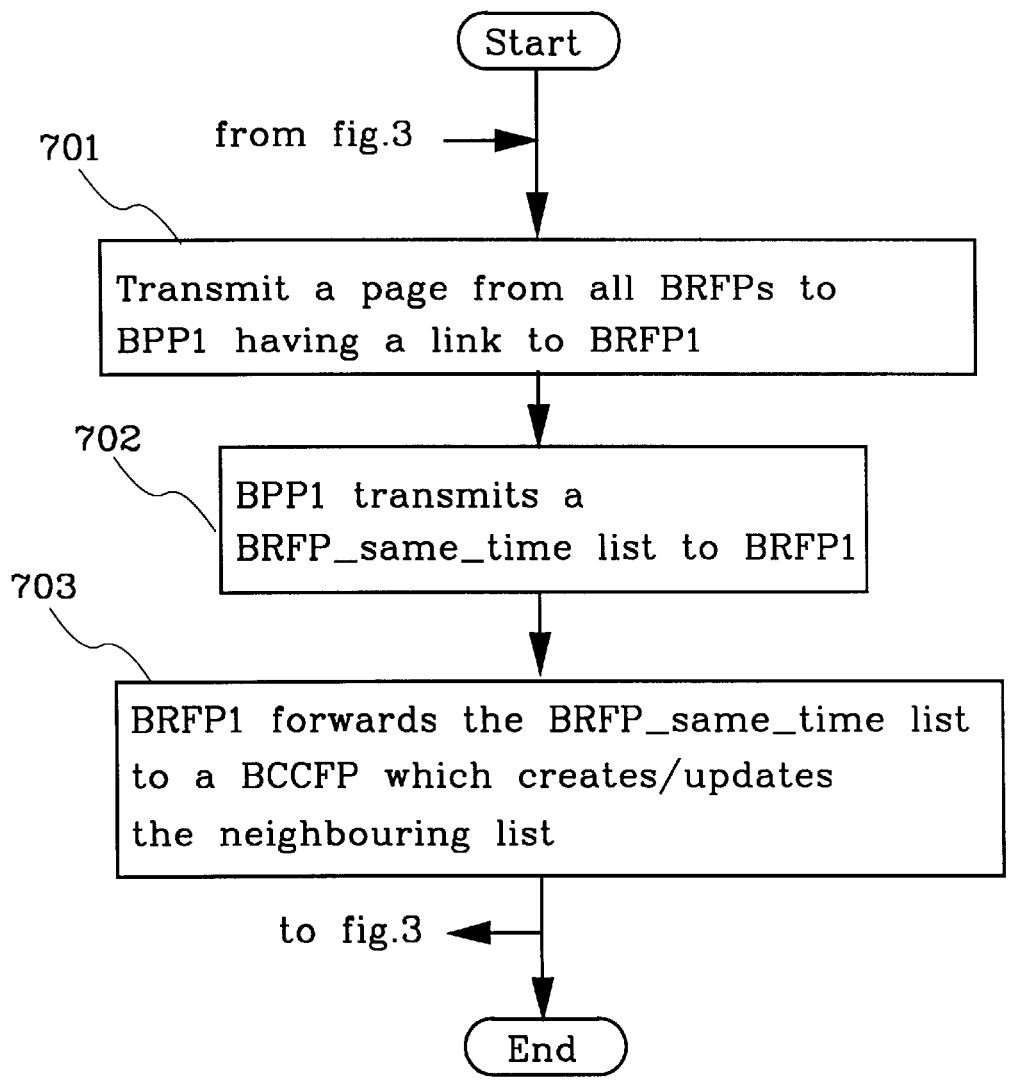
FIG. 7 is illustrating a flow chart of a first embodiment of a third method according to the present invention.

FIG. 7 illustrates a flow chart of a third method according to the present invention for collecting data for a neighbouring list for the respective BRFP in the system used e.g. in the second method above. The collected data is used for creating and updating the neighbouring lists for the respective BRFP. As previously been stated, the neighbouring list for the BRFP 105 comprises information of which additional BRFPs in the system that the BPP 101 in piconet 109 can hear. This can e.g. be performed when a new system is run for the first time, when new BRFPs are added to the system, at specified intervals, or when one or several BRFPs are moved to a new location within the system.

Figure 8A:
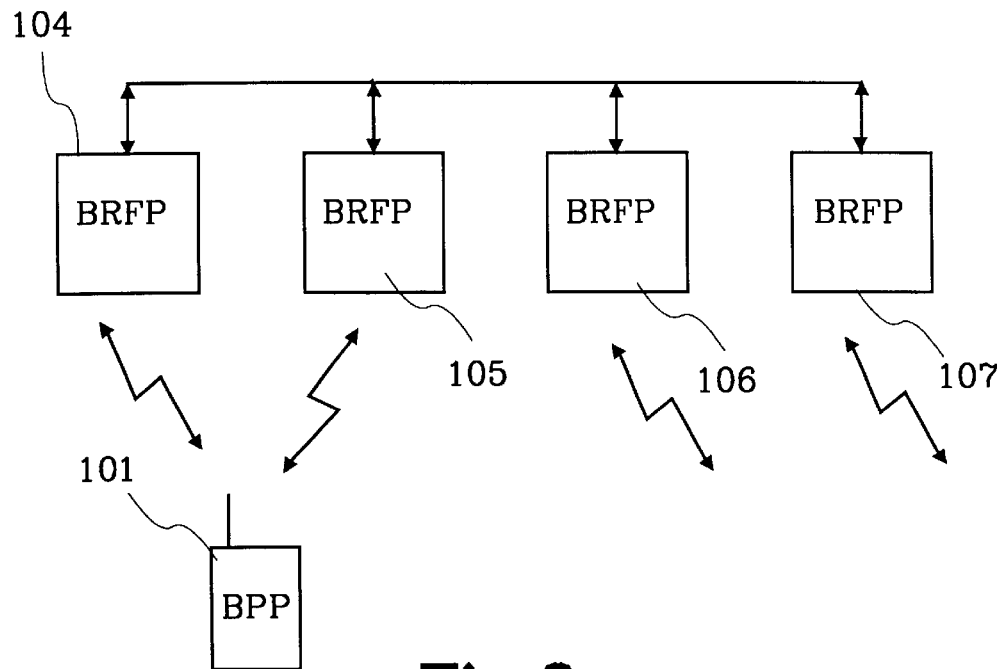
FIGS. 8a–b are illustrating a block diagram of a paging scenario according to the present invention.

According to a step 701, all BRFPs in the system 100 transmits a page signal (LC_PAGE) to the BPP 101, see FIG. 8a. The BRFPs have been given the identity of the BPP 101 from the BCCFP 108 which also may initiate this step.

According to a step 702, the BPP 101 transmits a response-signal (BRFP_same_time list) to the BRFP 105. The response-signal comprises information regarding which BRFP the BPP 101 can hear (e.g. detected a page signal from) at the same time and, as an alternative, also the signal strength on the detected page signal (LC_PAGE). This response signal may be transmitted each time a new BRFP has established beacon signalling with the BPP 101 (e.g. in step 307).

According to a step 703, the BRFP 105 forwards the information received in step 702 to the BCCFP 108. The BCCPF 108 collects this information and creates the neighbouring list for the BRFP 105 by registrating the BRFPs (except the BRFP 105) that the BPP 101 have heard in step 702 as neighbours to the BRFP 105 or if such a list already exists updates the neighbouring list accordingly. This can as an example be made by adding "new" neighbouring BRFPs, included in the response signal (BRFP_same_time list) but not registered in the neighbouring list, and deleting "old" neighbouring BRFPs, registered in the neighbouring list but not included in the response signal. A delay may be used for the deletion of BRFPs in the neighbouring list to avoid deletion of BRFPs that are just temporarily out of reach for the page. As an example, a certain BRFP on the list must be excluded from two or more consecutive response signals received according to step 702 before being removed from the neighbouring list.

Figure 8B:
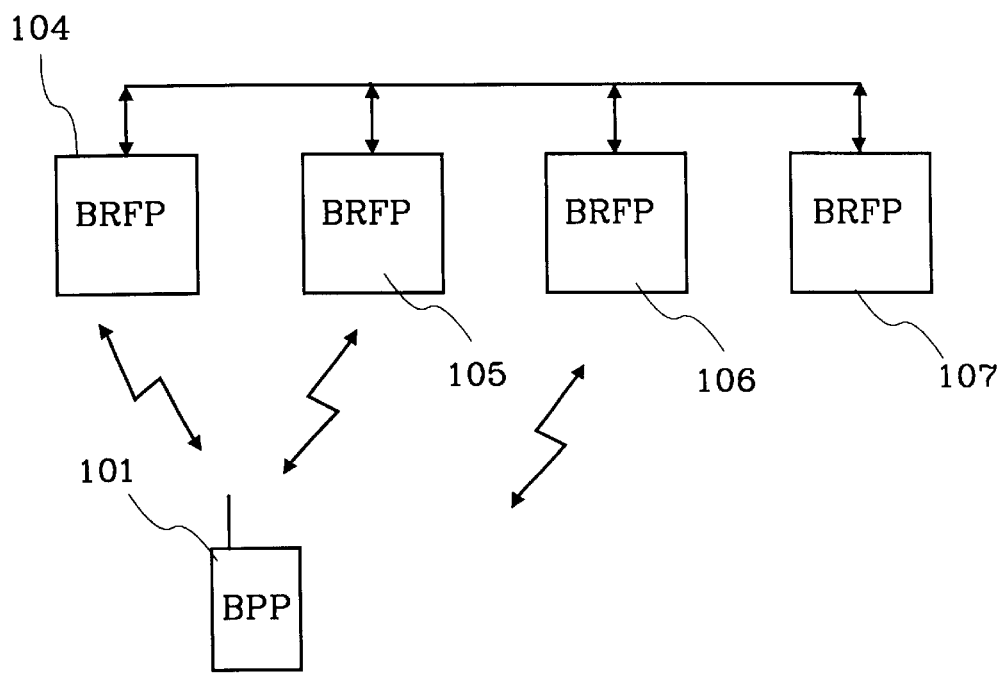

The BCCFP 108 can now direct signals to the BRFP serving a specific BPP in the system and its neighbouring BRFPs, e.g. for page signals, with the help of the neighbouring list which reduce the signalling within the system as seen in FIG. 8b. This improves the performance of the system.

Figure 9:
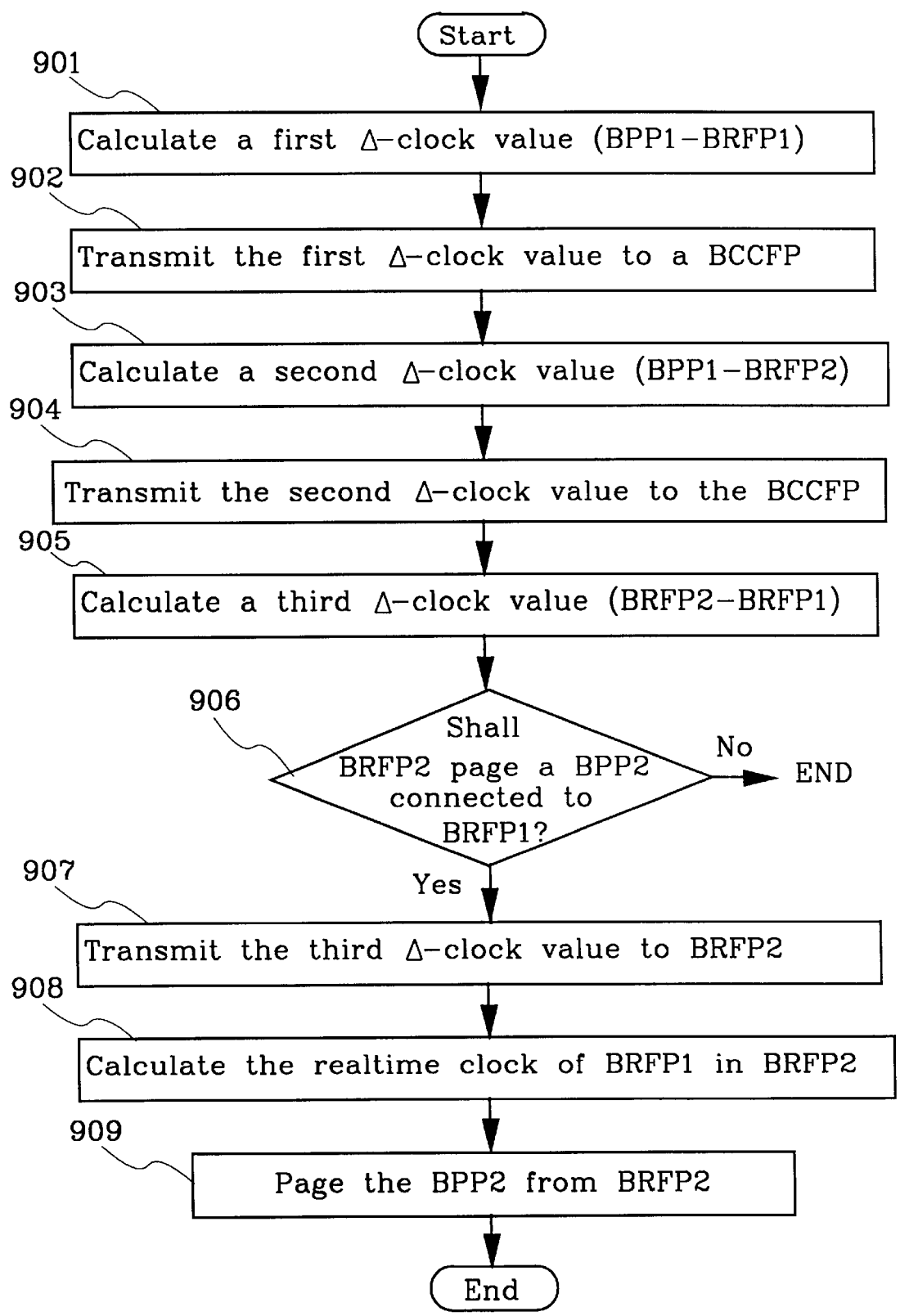
FIG. 9 is illustrating a flow chart of a fourth method according to the present invention.

FIG. 9 illustrates a flow chart of a fourth method according to the present invention where the realtime clock of a BRFP in one piconet is calculated by a BRFP in another piconet, e.g. the realtime clock of BRFP 105 is calculated by the BRFP 106, see FIG. 1. This method is preferably performed when more than one BRFP (from different piconets) have established a link with one and the same BPP. In the steps below both the BRFP 105 and the BRFP 106 in the system 100 have established a link with the BPP 102.

According to a step 901, the BRFP 105 calculates a first realtime_clock difference value ($\Delta 1\_CLOCK$) between the BPP 102 and its own realtime_clock (clock_BPP$_{102}$–clock_BRFP$_{105}$).

According to a step 902, the BRFP 105 transmits the calculated $\Delta 1\_CLOCK$ value to the BCCFP 108 which stores it in a sync-list or as an alternative in the neighbouring list.

According to a step 903, the BRFP 106 calculates a second realtime clock difference value ($\Delta 2\_CLOCK$) between the BPP 102 and its own clock (Clock_BPP$_{102}$–Clock_BRFP$_{106}$).

According to a step 904, the BRFP 106 transmits the calculated $\Delta 2\_CLOCK$ value to the BCCFP 108 which stores it in the sync-list. As an alternative, the BCCFP 108 can distribute $\Delta 1\_CLOCK$ and $\Delta 2\_CLOCK$ values to the BRFPs 104, 106 and 107.

According to step 905, the BCCFP 108 calculates the BRFP_realtime_clock difference value ($\Delta 3\_CLOCK$) between the BRFP 106 and the BRFP 105 (Clock_BRFP$_{106}$–Clock_BRFP$_{105}$) according to the following equation:

$$\Delta 3\_CLOCK = \Delta 1\_CLOCK - \Delta 2\_CLOCK = [\text{Clock\_BPP}_{102} - \text{Clock\_BRFP}_{105}] - [\text{Clock\_BPP}_{102} - \text{Clock\_BRFP}_{106}] = -\text{Clock\_BRFP}_{105} + \text{Clock\_BRFP}_{106} = \text{Clock\_BRFP}_{106} - \text{Clock\_BRFP}_{105}$$

The $\Delta 3\_CLOCK$ value is stored in the sync-list.

If, according to a step 906, the BCCFP wants the BRFP 106 to establish a link to the BPP 101 in the neighbouring piconet 109, e.g. establish beacon signalling according to step 305, the method continues with step 907 below, otherwise it ends.

According to step 907, the BCCFP 108 transmits the $\Delta 3\_CLOCK$ value to the BRFP 106 and orders the BRFP 106 to transmit an LC_PAGE to the BPP 101.

According to a step 908, the BRFP 106 calculates the realtime clock of the BRFP 105 (Clock_BRFP$_{105}$) to which the BPP 101 is listening, e.g. during park or active mode. Every BPP in a piconet uses the master clock (e.g. a BRFP clock) to track the common hopping channel in the piconet when the BPPs have assumed the roles as slaves. Hence if the master clock in a current piconet is known, the BPP in the current piconet can be easily reached from other BRFPs or BPPs outside the current piconet as long as they are within radio reach. The Clock_BRFP$_{105}$ is calculated according to the following equation:

$$\text{Clock\_BRFP}_{105} = \Delta 3\_CLOCK - \text{Clock\_BRFP}_{106} = \text{Clock\_BRFP}_{106} - \text{Clock\_BRFP}_{105} - \text{Clock\_BRFP}_{106} = \text{Clock\_BRFP}_{105}$$

According to step 909, the BRFP 106 transmits an LC_PAGE to the BPP 101 and establishes a new link and a new piconet with the BPP 101.

The calculation in step 905 can as an alternative be made in the BRFP 106 as well as the calculation in step 908 if the BCCFP 108 transmits the information regarding the BRFP_realtime differences that is stored in the sync-list to the BRFP 106.

In short, all the BRFPs in the cellular radio communication system calculates the realtime_clock differences between the BPPs they are connected to and their own realtime clocks. The BRFPs transmits the realtime_clock differences to the BCCFP 108 where they are used for calculating the BRFP_realtime_clock differences between each BRFP in the system. A first BRFP associated with a first piconet can then page a second BPP in a second piconet (e.g. to establish a new piconet) very accurately and quickly with the help of the BRFP realtime_clock difference as described in step 908.

Figure 10:
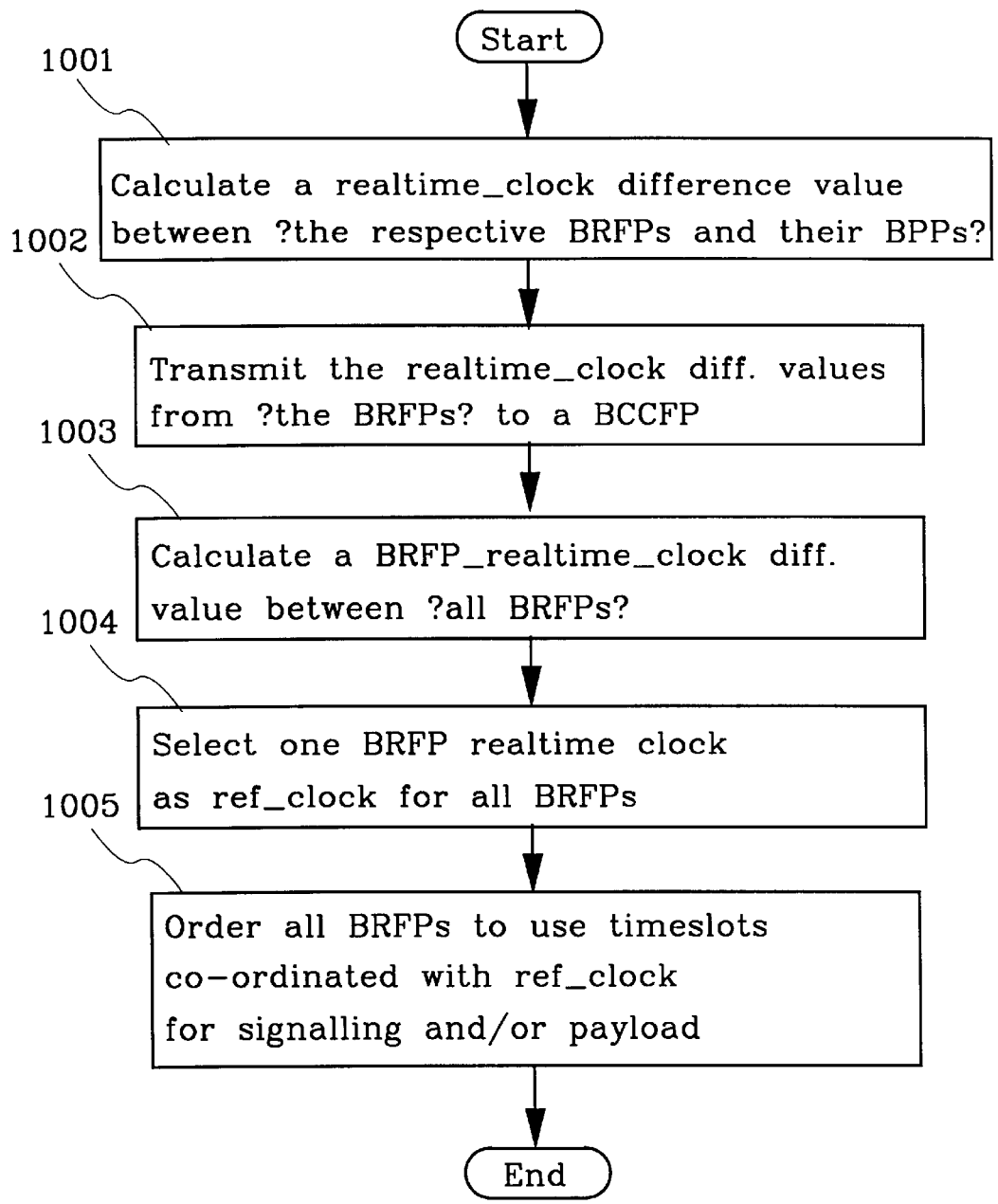
FIG. 10 is illustrating a flow chart of a fifth method according to the present invention.

FIG. 10 illustrates a flow chart of a fifth method according to the present invention for co-ordinating the use of timeslots in each piconet associated with the cellular radio communication system. This method is preferably performed when a call is in progress on a link in a piconet and hence one available time slot is occupied.

According to a step 1001, the BRFPs 104–107 in the system 100 calculates the realtime_clock differences between the BPPs they are connected to and their own realtime clocks as in step 901 and 903 according to FIG. 9.

According to a step 1002, the BRFPs 104–107 transmits the calculated realtime_clock differences to the BCCFP 108, as in step 902 and 904 according to FIG. 9.

According to a step 1003, the BCCFP 108 calculates the BRFP_realtime_clock differences between the BRFP 104–107, as in step 905 according to FIG. 9, from the realtime_clock differences received in step 1002.

According to a step 1004, the BCCFP 108 selects the realtime_clock of BRFP 104 as a reference clock (ref_clock) for all piconets in the system 100. This can as an example be made by giving the first slot from BRFP 104 the time value 0 whereby the other BRFPs are given an offset value according to their BRFP_realtime_clock difference with BRFP 104 which are e.g. added to or subtracted from their own realtime clocks.

According to a step 1005, the BCCFP 108 orders all BRFPs in the system 100 to use, as long as possible, a time slot co-ordinated with the ref_clock for signalling and payload to their respective BPP.

This means that the signalling in the system 100 can be made more effective by increasing the probabilities of a fast connection set-up between BPPs and BRFP in different piconets, since blocked time slots (blind_spots) will be more rare. Further on the total system capacity will increase.

Figure 11A:
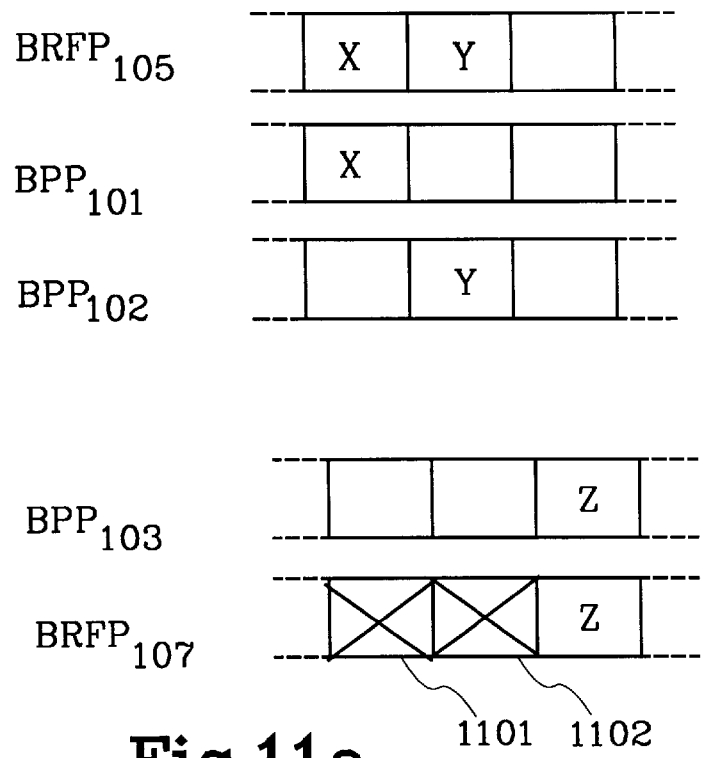
FIG. 11a is illustrating uncoordinated timeslots in two local radio networks.

FIG. 11*a* illustrates uncoordinated traffic and signalling in piconet 109 and 107 in system 100. There are three timeslots, each with a transmit portion and a receive portion, on the hopping channel in each piconet that the BPPs and BRFPs can use. BRFP 105 and BPP 101 communicates on the first timeslot and BRFP 105 and BPP 102 communicates on the second timeslot in piconet 109, which means that the third timeslot in piconet 109 is free. BRFP 107 and BPP 103 communicates on the third timeslot in piconet 110, which means that the first and second timeslot in piconet 110 are free. If BRFP 107 wants to page BPP 102 in piconet 109, the BRFP 107 has to use the first or second timeslot in piconet 110 (the free ones) but the corresponding timeslots in piconet 109 are not free. This means that the BRFP 107 can not reach the BPP 102 right know and have to wait until the communication on the first or second timeslot in piconet 109 stops. Hence two blind_spots 1101 and 1102 have occurred.

Figure 11B:
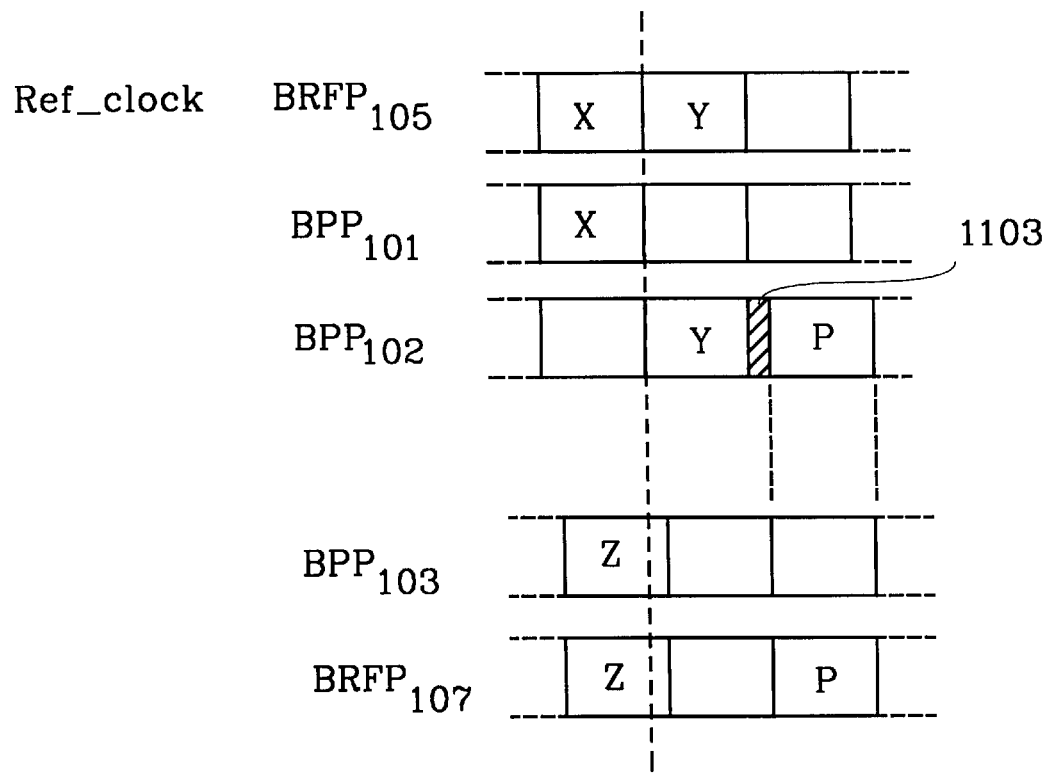
FIG. 11b is illustrating co-ordinated time slots in two local radio networks according to the present invention.

FIG. 11*b* illustrates the same traffic and signalling as in figure 11*a* but co-ordinated according to the fifth method (FIG. 10). The realtime clock of the BRFP 105 is selected as the ref_clock and the BRFP 107 has co-ordinated its traffic to BPP 103 accordingly so that the BPP 102 can be reach by a page P from the BRFP 107 in the third timeslot. The third timeslot in BPP 102 is synchronised with the third timeslot in BRFP 107 by introducing a small pause 1103 between the second and third timeslot in BPP 102. This means that a part of the space where the next timeslot in BPP 102 (the first one due to the three time slot scheme) where to be put is used for the third timeslot. The first timeslot can therefore not be used for the moment. As seen in figure 11*b* the BRFPs in the respective piconet are still not synchronised to each other.

The inventive methods according to FIGS. 2, 3, 6, 7, 9 and 10 can be completely or partially implemented as software in at least one microprocessor.

As previously been described, FIG. 1 illustrates a block diagram of a first embodiment of a cellular radio communication system 100 for utilising the present invention. The BRFPs in FIG. 1 are connected to the BCCFP 108 via a local area network (LAN) 111.

Figure 12:
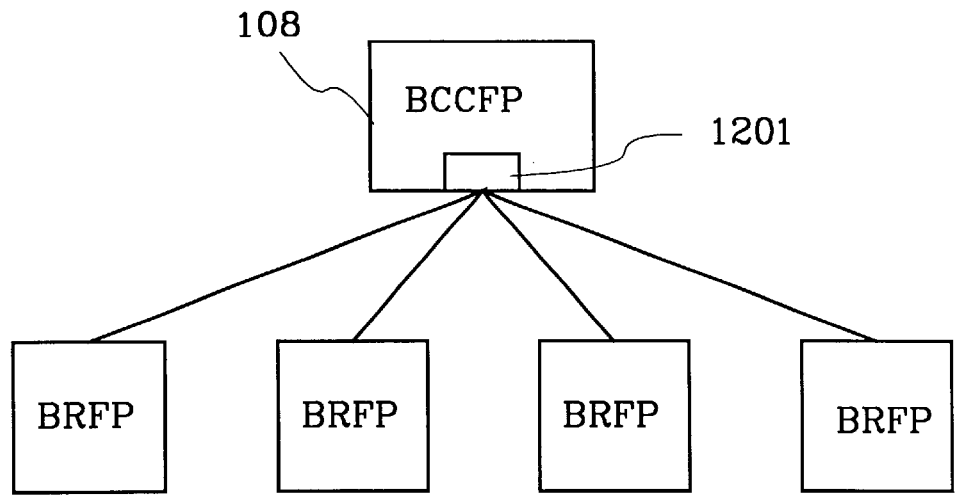
FIG. 12 is illustrating a block diagram of a second embodiment of a cellular radio communication system according to the present invention.

FIG. 12 illustrates an alternative connection where each BRFP is circuit switched connected to a switch 1201, preferably arranged in the BCCFP 108, via dedicated transmission lines. The BRFPs can as another alternative be connected to the BCCFP 108 via one or more radio links, e.g. a radio-LAN or wireless-LAN (WLAN).

Each BRFP and BPP comprises at least one Bluetooth circuit/chip for utilising the radio communication over the Bluetooth radio interface. The Bluetooth radio interface is one example of a radio interface utilised in small short range local radio network. Other radio interfaces with similar characteristics may also be used.

The system 100 can as an example be an indoor cellular radio communication system where the first piconet 109 is situated in a first room and the second piconet 110 is situated in a second room. The BRFPs 105 and 107 can as an example be personal computers (PCs) with means for radio communication and connected to the LAN 111. The BPP 101 can as an example be a cordless phone, the BPP 102 a laptop with means for radio communication and the BPP 103 a printer with means for radio communication. The BRFP 106 may be a phone situated in a third room and connected to the LAN by wire. If the BPP 101 is moved to the third room the BRFP 106 and the BPP 101 establishes a connection and hence forms a new (third) piconet.

A complete cellular radio communication system needs to have some basic functionality's to work and reach an acceptable system behaviour. Those are described in the methods according to FIGS. 2, 3, 6, 7, 9 and 10.

All these basic functionality's are provided in the cellular radio communication system 100 according to the present invention. This is achieved by the BCCFP 108 (the control node) connected to all BRFPs in the system 100.

Figure 13A:
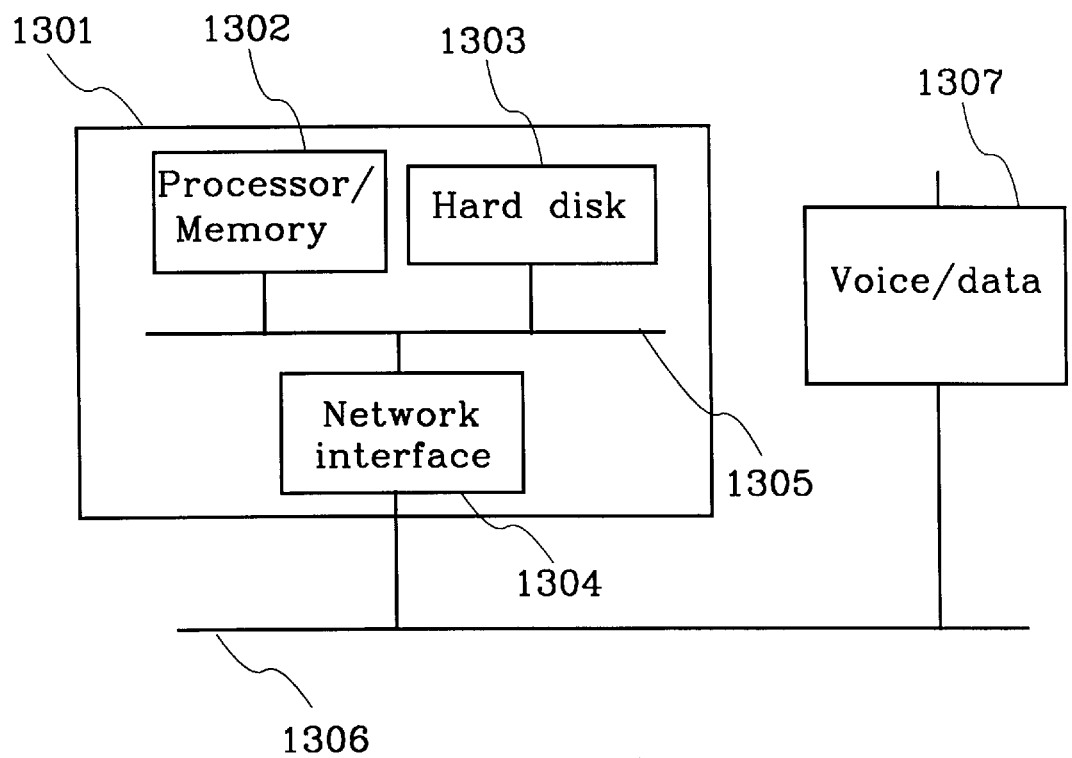
FIG. 13a is illustrating a schematic block diagram of a first embodiment of a control node according to the present invention.

FIG. 13*a* illustrates a schematic block diagram of a first embodiment of a BCCFP 1301 (control node) according to the present invention. The BCCFP 1301 comprises a processor with a memory 1302, a hard disk 1303 and a network interface 1304 connected to each other by a computer bus 1305. The processor with the memory is e.g. used for creating and updating the neighbouring lists and calculating realtime clock differences. The hard disk is e.g. used for storing the neighbouring lists, realtime clock and identity information. The network interface 1304 is used for connecting the BCCFP to the BRFPs via a LAN 1306. All voice and data traffic is separated from the BCCFP in this embodiment and hence processed by a separate voice/data unit 1307 connected to the LAN 1306.

Figure 13B:
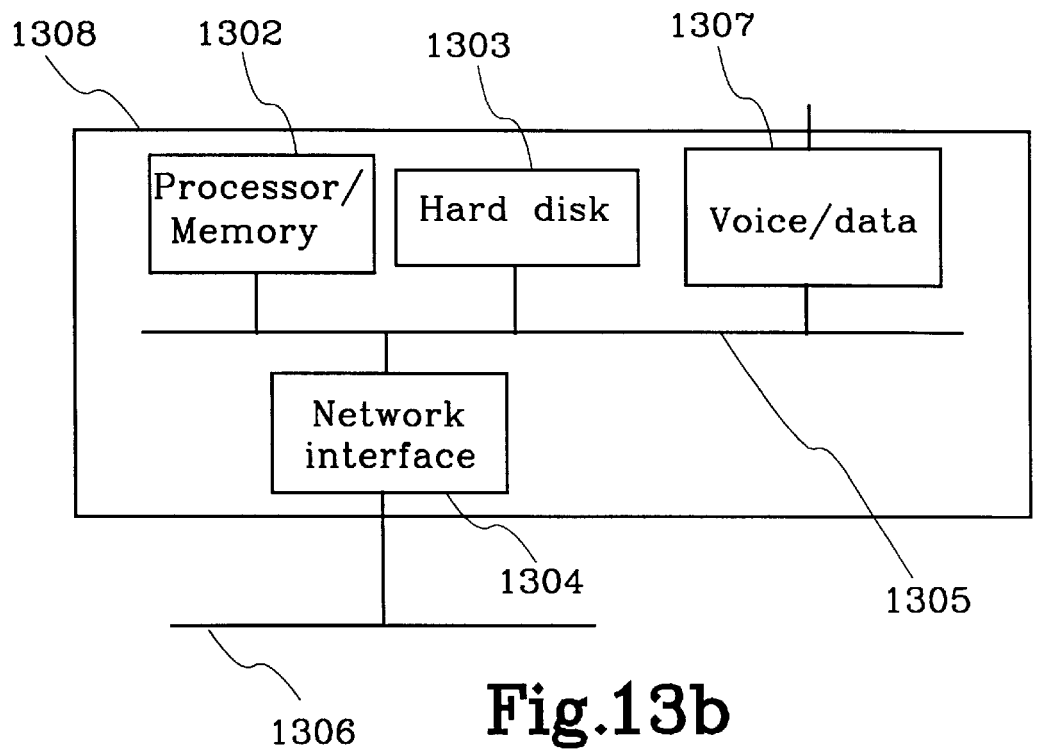
FIG. 13b is illustrating a schematic block diagram of a second embodiment of a control node according to the present invention.

FIG. 13*b* illustrates a schematic block diagram of a second embodiment of a BCCFP 1308 according to the present invention where the voice/data unit 1307 is integrated in the BCCFP 1308. The voice/data unit 1307 comprises a voice codec and means for conversion between circuit switched and packet switched information.

Figure 14:
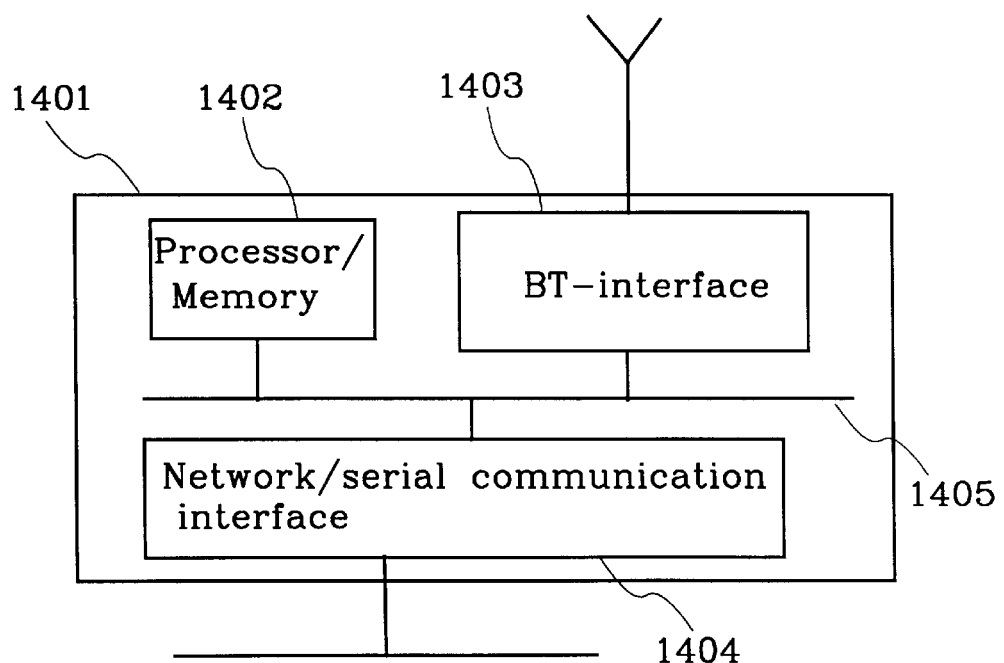
FIG. 14 is illustrating a schematic block diagram of a radio node according to the present invention.

FIG. 14 illustrates a schematic block diagram of a BRFP 1401 (radio node) according to the present invention. The BRFP comprises a processor with a RAM memory and a flash memory 1402, a bluetooth radio interface chip/unit 1403 and a network or serial communication interface 1404 connected to each other by a computer bus 1405. The processor with the RAM memory and flash memory is e.g. used for processing and distributing realtime clock information. The bluetooth radio interface chip/unit has previously been described. The network interface is used for connecting the BRFP to a LAN according to FIG. 1 and the serial communication interface is used if the BRFP is circuit switched connected according to FIG. 12.

What is claimed is:

1. A method for retaining a connection to a first radio unit in a cellular radio communication system comprising a number of local radio networks utilizing radio interfaces which, between said local radio networks, are unsynchronized with each other, and where each of said local radio networks comprises a radio node arranged to communicate with a plurality of radio units, the method comprising:

establishing a beacon signaling from said first radio node to said first radio unit in a first local radio network;

measuring in a first measurement at least one signal parameter on said beacon signal from said first radio node at said first radio unit and transmitting said first measurement to said first radio node in a response signal; and measuring in a second measurement said at least one signal parameter on at least one signal from said first radio unit at said first radio node and forwarding said first and second measurement to a control node associated with said radio nodes.

2. A method as claimed in claim 1, wherein said method further comprising the steps of:

ordering neighboring radio nodes to said first radio node to page said first radio unit;

establishing a beacon signaling from said neighboring radio nodes to said first radio unit; and measuring said at least one signal parameter on signals from said first radio unit at said radio nodes.

3. A method as claimed in claim 2, wherein said neighboring radio nodes are registered in a neighboring list (FIG. 5) in said control node, where said neighboring list includes information of which radio nodes in said system that are within radio coverage of said first radio unit when said first radio unit is located In said first local radio network.

4. A method as claimed in claim 1, wherein each one of said radio nodes shares one frequency hopping channel with those radio units that said radio nodes are connected to in their respective local radio network.

5. A method as claimed in claim 1, wherein said first and second measurement are stored in a BRFP_candidates list in said control node.

6. A method for collecting data for a neighboring list in a cellular radio communication system comprising a number of local radio networks utilizing radio interfaces which, between said local radio networks, are unsynchronized with each other, and where each of said local radio networks comprises a radio node arranged to communicate with a plurality of radio units, the method comprising:

transmitting a page signal from all radio nodes in said system to a first radio unit connected to a first radio node;

transmitting a response signal from said first radio unit to said first radio node where said response signal includes information of which of said radio nodes said first radio unit has detected a page signal from; and forwarding said response signal from said first radio node to a control node associated with said radio nodes.

7. A method as claimed in claim 6, wherein said neighboring list is created from said response signal in said control node by registrating said radio nodes from which said first radio unit has detected a page signal as neighbors to said first radio node.

8. A method as claimed in claim 6, wherein said neighboring list in said control node is updated from said response signal in said control node.

9. A method as claimed in claim 6, wherein said response signal also includes information of at least one signal parameter measured by said first radio unit on said detected page signals from said radio nodes.

\* \* \* \* \*